(12) United States Patent
Bowes

(10) Patent No.: US 11,603,036 B2
(45) Date of Patent: Mar. 14, 2023

(54) APPARATUS AND METHOD FOR WINCH LIGHTING

(71) Applicant: Quadratec, Inc., West Chester, PA (US)

(72) Inventor: David M. Bowes, Glenmoore, PA (US)

(73) Assignee: Quadratec, Inc., West Chester, PA (US)

( * ) Notice: Subject to any disclaimer, the term of this patent is extended or adjusted under 35 U.S.C. 154(b) by 0 days.

(21) Appl. No.: 17/455,718

(22) Filed: Nov. 19, 2021

(65) Prior Publication Data

US 2022/0250536 A1   Aug. 11, 2022

Related U.S. Application Data

(60) Provisional application No. 63/147,353, filed on Feb. 9, 2021.

(51) Int. Cl.
| | |
|---|---|
| *B60Q 1/26* | (2006.01) |
| *B66D 1/12* | (2006.01) |
| *B60D 1/64* | (2006.01) |
| *B60D 1/18* | (2006.01) |

(52) U.S. Cl.
CPC ............ *B60Q 1/2619* (2013.01); *B60D 1/185* (2013.01); *B60D 1/64* (2013.01); *B66D 1/12* (2013.01)

(58) Field of Classification Search
CPC .................................................... B60Q 1/2661
See application file for complete search history.

(56) References Cited

U.S. PATENT DOCUMENTS

| | | | |
|---|---|---|---|
| 9,682,649 B2* | 6/2017 | Salter .................... | B60Q 1/2661 |
| 10,392,235 B2* | 8/2019 | Fretz ......................... | B66D 1/28 |
| 10,538,196 B2* | 1/2020 | Centerbar ............. | A01B 59/062 |

FOREIGN PATENT DOCUMENTS

CN           205239422 U   *   5/2016

* cited by examiner

*Primary Examiner* — Robert J May

(57) ABSTRACT

A winch drum light assembly comprises a bracket having at least one attachment location for attaching the bracket to a vehicle or to a vehicle component that is attached to the vehicle; and a light member for producing light and situated on the bracket, the light member including a power connection adapted for connecting the vehicle's power or an alternative source of power to the light member.

20 Claims, 15 Drawing Sheets

APPARATUS AND METHOD FOR WINCH LIGHTING

CROSS REFERENCE TO RELATED APPLICATIONS

This application claims priority under 35 U.S.C. § 119 to provisional patent application U.S. 63/147,353, which is hereby incorporated by reference in its entirety.

BACKGROUND OF THE INVENTION

Field of the Invention

The present invention relates to winches, and in particular to winch lighting. Specifically, a method and apparatus are described for lighting a vehicle winch.

Description of Related Art

Vehicles, such as off-road vehicles, are often equipped with various accessories that provide vehicles with useful operating features. One example of a useful vehicle accessory is a winch. A winch comprises a drum, a motor to rotate the drum, a cable that is wrapped around the drum, and an attachment member at an end of the cable. Winches typically are used with a fairlead (or are used with a fairlead integrated into a bumper) to guide the cable as the winch motor rotates the drum. A fairlead includes an opening through which the cable extends and retracts from the winch. Fairleads are known in the art (see U.S. Pat. Nos. 10,519,012 and 10,443,793)

When a winch cable is retracted, it is desirable for the cable to be wrapped around the drum in a neat and uniform manner. Winch operators are aware of the importance of uniform cable wrapping. A winch operator may wear heavy gloves and use his hands to guide the cable around the drum in a uniform manner.

Various disadvantages result from non-uniform cable wrapping. If a cable is pinched between adjacent windings, the cable might become "stuck" and unable to extend or retract. If a cable is overfilled on one side of the drum, the cable might not fit in its entirety around the drum. Non uniform wrapping may also result in what is called a "bird's nest" situation. When bird's nest occurs, the cable is not in uniform tension about the drum. Sharp variations in cable tension may result in a dangerous situation, as the tension variations may result in sudden increases in tension (with a haphazard tug) followed by periods of insufficient tension for the winch to achieve effective pulling.

In any of the above situations, damage to the cable may occur. Not only are winch cables expensive to replace, but sudden cable snapping can be extremely dangerous, given that the cable may be under 500 lbs. of tension (or more).

SUMMARY OF THE INVENTION

A winch drum light assembly comprises a bracket having at least one attachment location for attaching the bracket to a vehicle or to a vehicle component that is attached to the vehicle; and a light member for producing light and situated on the bracket, the light member including a power connection adapted for connecting the vehicle's power or an alternative source of power to the light member.

DETAILED DESCRIPTION

One method of ensuring uniform cable wrapping around the drum is to illuminate a portion of the winch. If an operator cannot see how a cable is being wrapped, the operator can neither monitor cable uniformity nor guide the cable to achieve uniformity. Winch lighting may improve visibility of the cable as it wraps around the drum during both daylight hours and nighttime hours. By lighting the winch drum, a winch operator can see the cable as it wraps around the drum (either at night or in undesirable day lighting conditions), and can guide the cable (wearing gloves) around the drum so that the cable is wrapped around the drum in a uniform manner.

Westin Corporation manufactures the SX10000 lighted winch (see U.S. Pat. No. 10,633,229). Most winches, however, do not include lighting. It would thus be desirable to add lighting to a winch that is not manufactured with lighting. It would also be desirable to include lighting in alternative winch designs.

Figure 1:
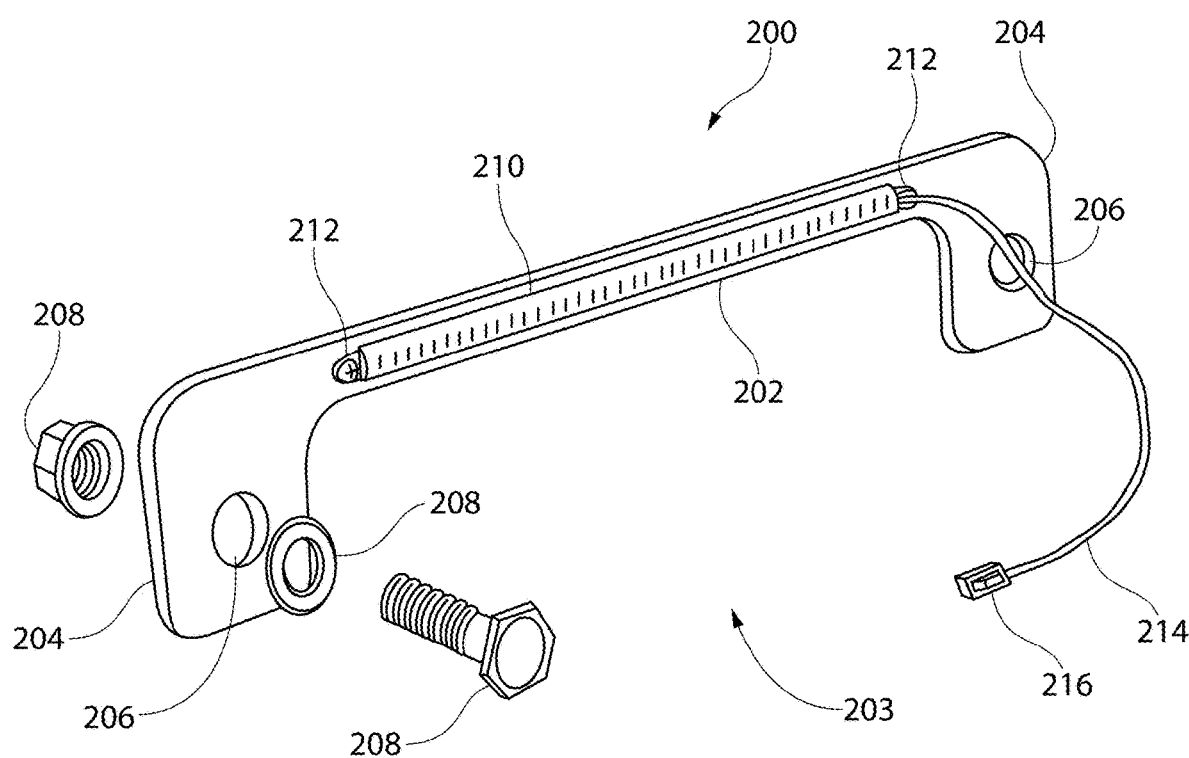
FIG. 1 is a perspective drawing of a winch drum light assembly in accordance with an exemplary embodiment of the present invention.

FIG. 1 is a perspective drawing of a winch drum light assembly in accordance with an exemplary embodiment of the present invention. The winch drum light assembly illustrated in FIG. 1 includes bracket 200. Bracket 200 is desirably comprised of 16-gauge sheet metal, but other thicknesses of sheet metal may be used, and other materials such as plastic with sufficient structural strength may be used.

Bracket 200 comprises cross member 202 and tabs 204 located on the left and right side of cross member 202 respectively. Cross member 202 and tabs 204 define open area 203 situated below cross member 202 and between tabs 204. During use, the winch's cable will travel (extend and retract) within open area 203. Thus, cross member 202 is designed with sufficient length (and tabs 204 are situated on opposite ends of cross member 202 at a sufficient distance), so that open area 203 coincides with the opening of a fairlead (or the opening of a front member such as a front bumper with a built-in fairlead opening). Thus, open area 203 may have a width, for example, of approximately 7 inches.

Each tab 204 includes at least one attachment location 206 for attaching bracket 200 to a front member of a vehicle (not shown). As an example, each attachment location 206 is for attaching bracket 200 to a front bumper of a vehicle (the front bumper may or may not include a built-in fairlead). Attachment location 206 appears in FIG. 1 as openings, but this is merely exemplary. Attachment location 206 may include male members, female members, or some kind of hooking or other attachment mechanism. In this exemplary embodiment, location 206 is shown in combination with attachment members 208, but again this is merely exemplary. Attachment members 208 are shown as bolts, washers and nuts, but this is merely exemplary.

Attached to one surface of cross member 202 is light member 210. In one exemplary embodiment, light member 210 may be an LED light strip, but this is merely exemplary as other forms of light generation may be used. An exemplary light member is the Elemental 4 TIR LED Grille. Light member 210 may be attached to cross member 202 via a suitable attachment mechanism, such as screws, adhesion, a "slotted" fit, etc. In the example shown in FIG. 1, exemplary screws 212 are shown for attaching light member 210 to cross member 202. In other examples, cross member 202 and light member 210 are integrated into a single package.

Extending from light member 210 is wire 214 for supplying power to light member 210. Light member 210 is energized and provides light when electricity of sufficient voltage is provided thereto via wire 214. As the source of electricity to light member 210 is typically a 12-volt car battery, the voltage from the 12-volt car battery may need to be stepped down by an optional voltage converter (not shown). The SMAKN DC/DC (12V to 3V) converter (model 5864305279) is an exemplary step-down converter.

Wire 214 may be terminated with leads for receiving power, or, in an exemplary embodiment of the present invention, wire 214 may be terminated with an appropriate plug-like member for ease of installation. In FIG. 1, power connection 216 is illustrated. Power connection 216 may be connected directly to a power source, or it may be connected to a power source indirectly via an intermediate device that performs one or more functions including voltage step-down, turning light member 210 on (responsive to one or more events, further discussed below), turning light member 210 off (responsive to one or more events, further discussed below), etc.

Figure 2:
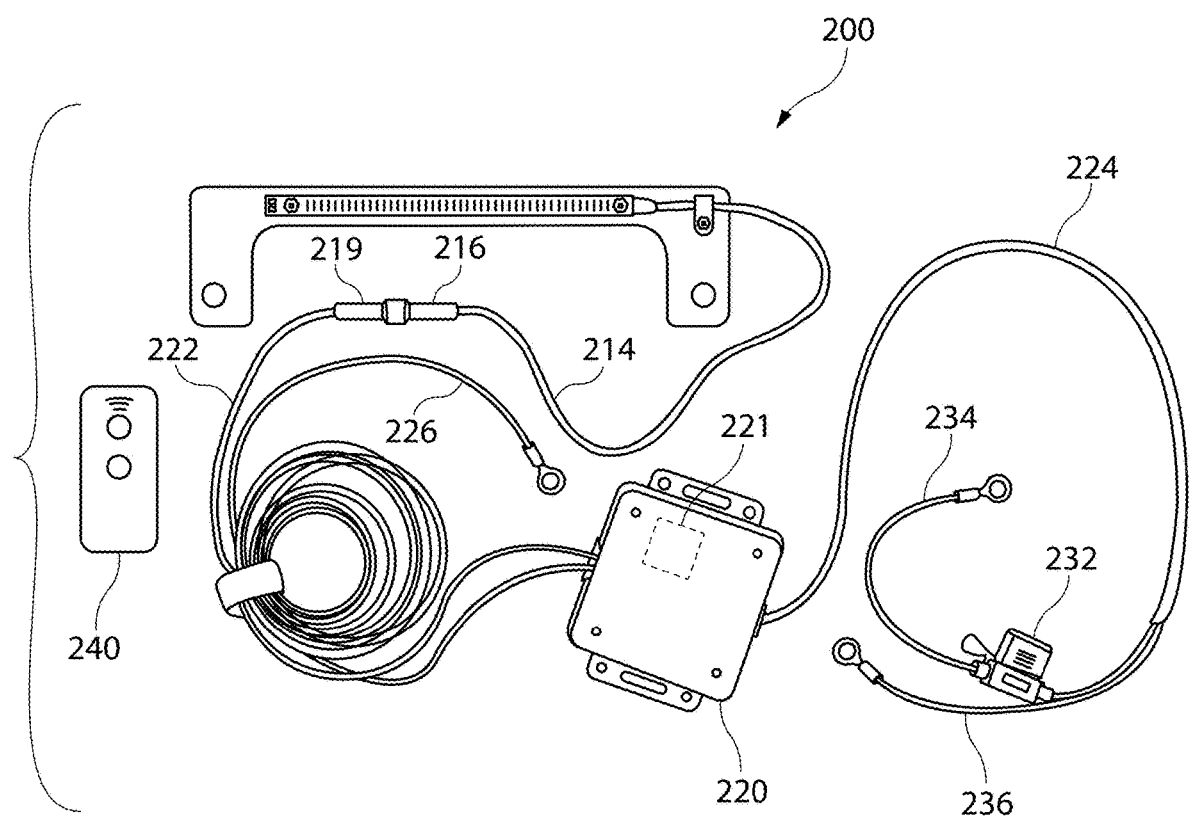
FIG. 2 is a diagram that illustrates a plurality of components that comprise a winch drum light assembly in accordance with an exemplary embodiment of the present invention.

FIG. 2 illustrates a plurality of components that comprise a winch drum light assembly in accordance with an exemplary embodiment of the present invention. In the upper portion of FIG. 2, bracket 200 is shown. FIG. 2 illustrates wire 214 coupled to power module 220 via a connection that may include, for example, connector 219 and wire assembly 222. Extending from power module 220 is trigger wire 226. Power module 220 receives power (for example from a 12 volt car battery) via wire assembly 224. Wire assembly 224 includes power wire 234 and ground wire 236, both of which may be connected to the power source. Fuse holder 232 (for holding a fuse, not shown) may also be included.

Power connection 216 and connector 219 may provide a water-tight connection. This connection facilitates ease of installation and allows bracket 200 to be serviced without also removing receiver 221. Trigger wire 226 connects to the "A" terminal (armature) on any winch motor. When winch motor is running, trigger wire 226 receives 12 volts to activate power module 220 which energizes light member 210 included with bracket 200. If winch motor is stopped, light member 210 included with bracket 200 is prevented from being energized by power module 220 (or light member 210 stops being energized after a delay).

In a further alternative embodiment, trigger wire 226 is attached to a location other than the "A" terminal of a winch to receive a "trigger." This is further discussed below. In a further alternative embodiment of the present invention, there are variations to how power module 220 is prevented from energizing light member 210. In various examples, light member 210 is prevented from being energized by power module 220 with various variations, including immediately when the winch motor stops, immediately when it is detected that the winch motor has stopped, a predetermined time after when the winch motor stops, etc. This will further be discussed below.

Power wire 234 connects (directly or indirectly) to a positive battery terminal. Ground wire 236 connects (directly or indirectly) to a negative battery terminal.

Power module 220 detects an event indicating that light member 210 should be energized. Detection occurs via a signal received via trigger wire 226. The signal can be a rising signal (e.g. voltage), a falling signal (e.g. voltage), or a steady signal (e.g. voltage). The signal can be in the form of voltage received from the winch motor armature. The signal can be based on a fluctuation of voltage, current, etc. The signal can be a signal received from a sensor, such as a mechanical sensor, a motion detection sensor, a piezoelectric sensor, etc. Such sensors may generate a signal responsive to mechanical detection (e.g. a mechanical switch that is actuated responsive to physical rotation of the motor), a motion sensor that detects motion of the winch cable, a piezoelectric sensor that detects change of orientation of the winch drum, an inductive sensor that detects an inductive field created by actuation of the winch motor, a capacitive sensor that detects a change in capacitance as a metal winch cable moves (during extension and retraction), etc. The above forms of detection are not intended to be limitations on the type of detections that may occur, but are offered merely as examples. A person of ordinary skill in the art, having seen the above list, may recognize that other forms of motion detection may be implemented as well.

FIG. 2 also illustrates optional remote controller 240. Remote controller 240 may be used to energize light member 210. After being turned on by remote controller 240, light member 210 can be turned off in one or more of various manners, including after a period of time has elapsed on a timer, lack of motion detection (whether by detecting actual motion or detecting a parameter associated with motion, including electrical signal levels or transitions, capacitive changes, etc.) and/or a signal transmitted by remote controller 240 (or lack of a transmitted signal) may be used to de-energize light member 210.

In one embodiment, power module 220 includes receiver 221 for receiving wireless/IR signals from a remote controller in order to operate power module 220 via remote control. In one embodiment, receiver 221 is able to interact with remote controller 240. In other embodiment, a winch with a respective remote controller for operating the winch (via remote control) is in use, and the winch's remote controller is able to interact with receiver 221 as well.

Figure 3A:
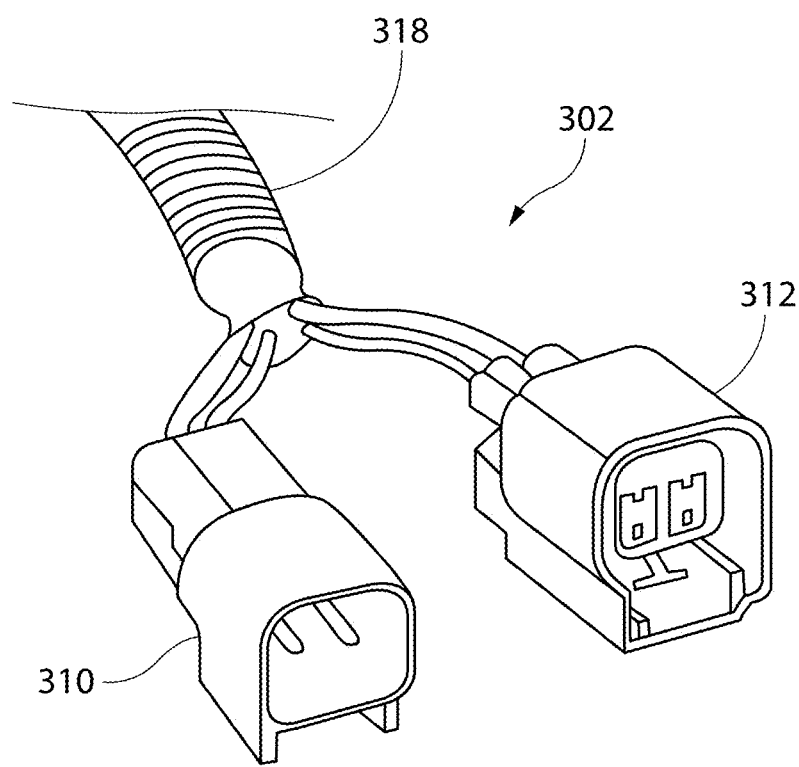
FIG. 3a and FIG. 3b are perspective drawings that illustrate a Y-Cable Assembly that may be used with a winch drum light assembly in accordance with an exemplary embodiment of the present invention.
Figure 3B:
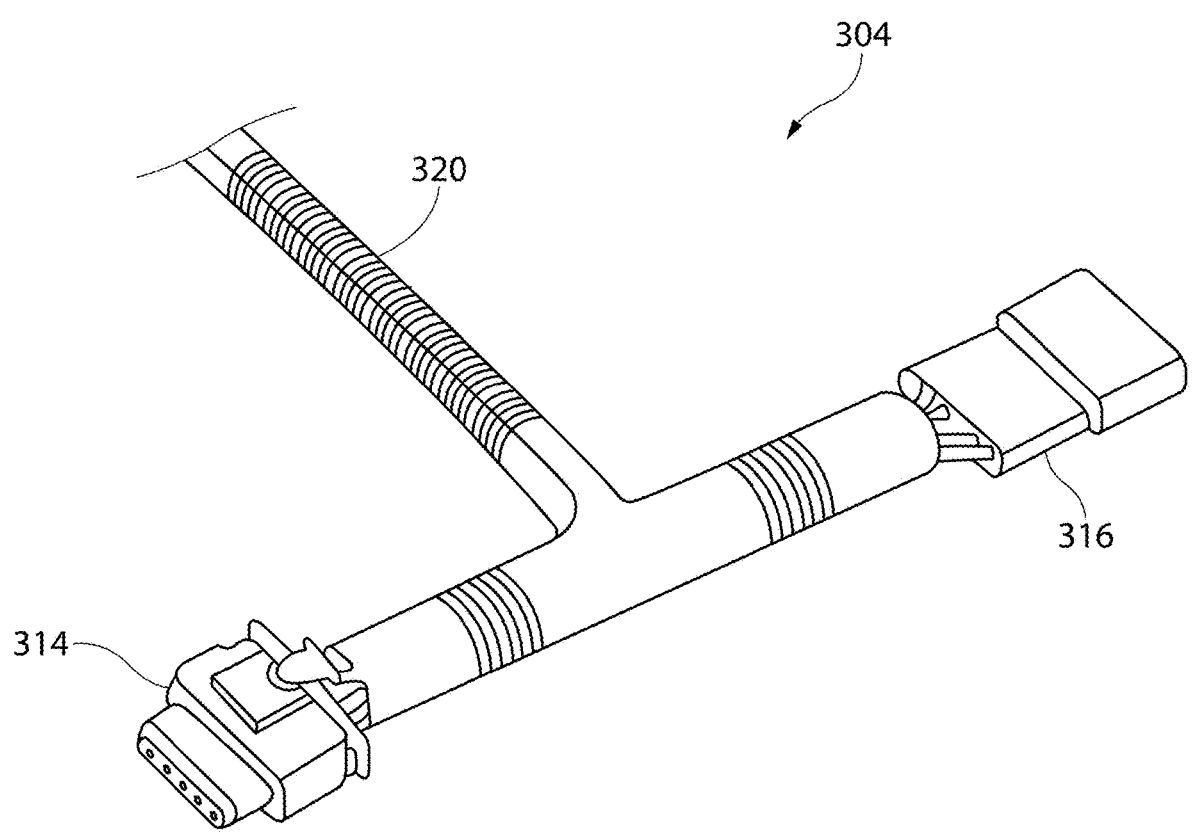

FIG. 3a and FIG. 3b illustrate exemplary harnesses 302 and 304 for providing power to bracket 200 (either directly or indirectly via, for example, power module 220). Each harness may be inserted between existing connections within an automotive vehicle in order to provide a further location for providing power to bracket 200 (directly or indirectly). Harness 302 provides an additional power source connection for JK Jeep, model years 2007-18 (Jeep is a registered trademark of FCA, Inc.). Harness 304 provides an additional power source connection for JL Jeep, model years 2018-21. Other harnesses may be suitable for other vehicles, depending upon the electrical connections included with those vehicles. Each harness may be inserted at the connection to the vehicle's marker lights for example. In this manner, the light member 210 is energized whenever the vehicle's running lights are on. This is merely exemplary as the harness can be inserted at other vehicle power connections as well.

Figure 4:
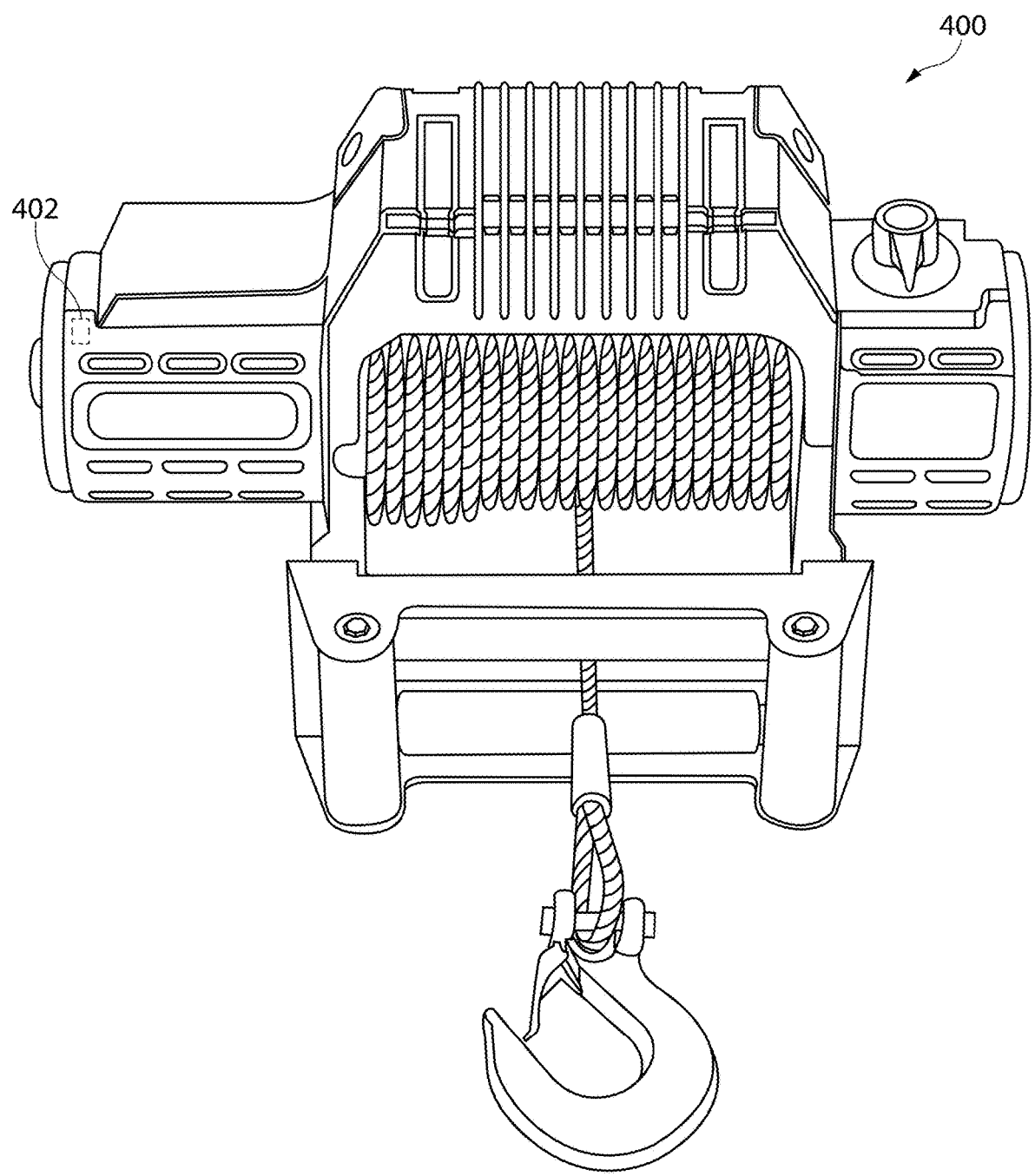
FIG. 4 is a perspective drawing of a winch in accordance with an exemplary embodiment of the present invention.

FIG. 4 illustrates a winch according to a further exemplary embodiment of the present invention. FIG. 4 illustrates a modification of an exemplary (Stealth) winch 400 sold by Quadratec, Inc, West Chester, Pa. Winch 400 includes optional outlet 402. In one embodiment, outlet 402 receives power connection 216. In another embodiment outlet 402 additionally or alternately receives a connection that terminates power wire 234, ground wire 236 and/or trigger wire 226. Thus, power is delivered to light member 210 either via outlet 402 or from the vehicle battery. Alternatively or in addition, a trigger signal is delivered to (optional) receiver 221 via trigger wire 226 from outlet 402. In some embodiments, power module 220 and/or receiver 221 is integrated into winch 400 and the output of outlet 402 is equivalent to the output of connector 219.

Figure 5A:
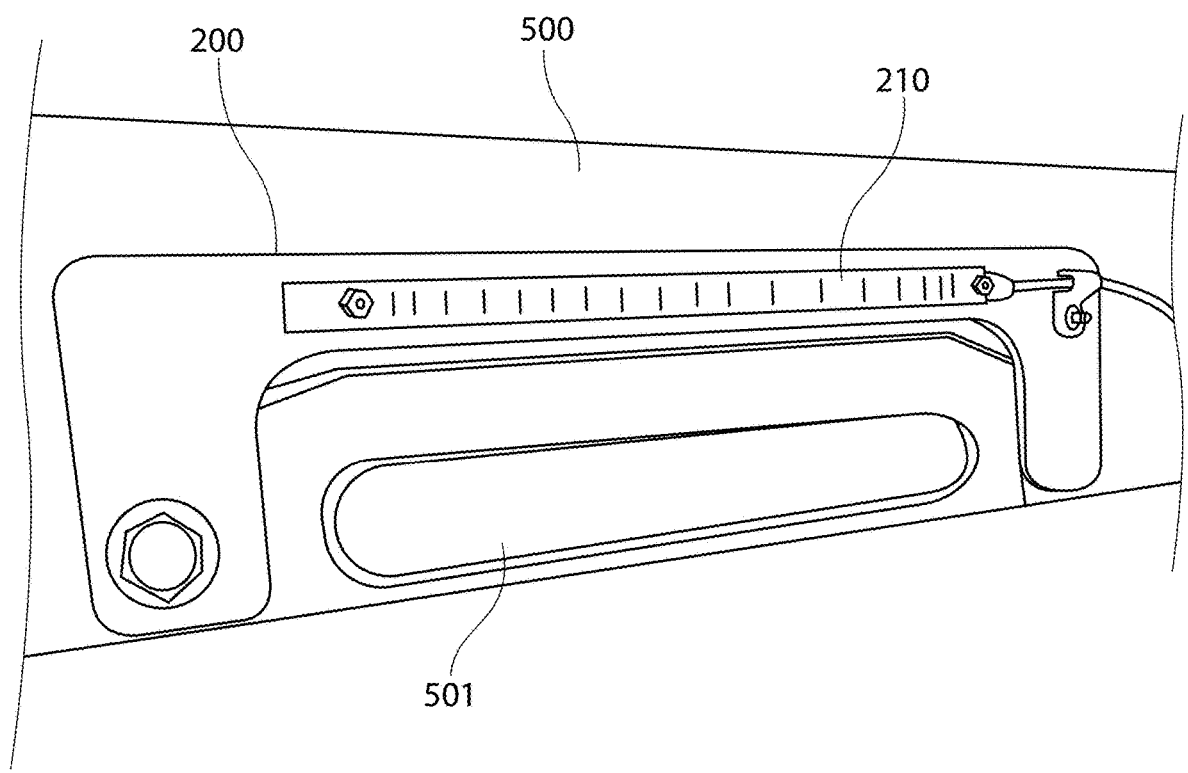
FIG. 5a illustrates a winch drum light assembly in a first configuration relative to a vehicle front member in accordance with an exemplary embodiment of the present invention.
Figure 5B:
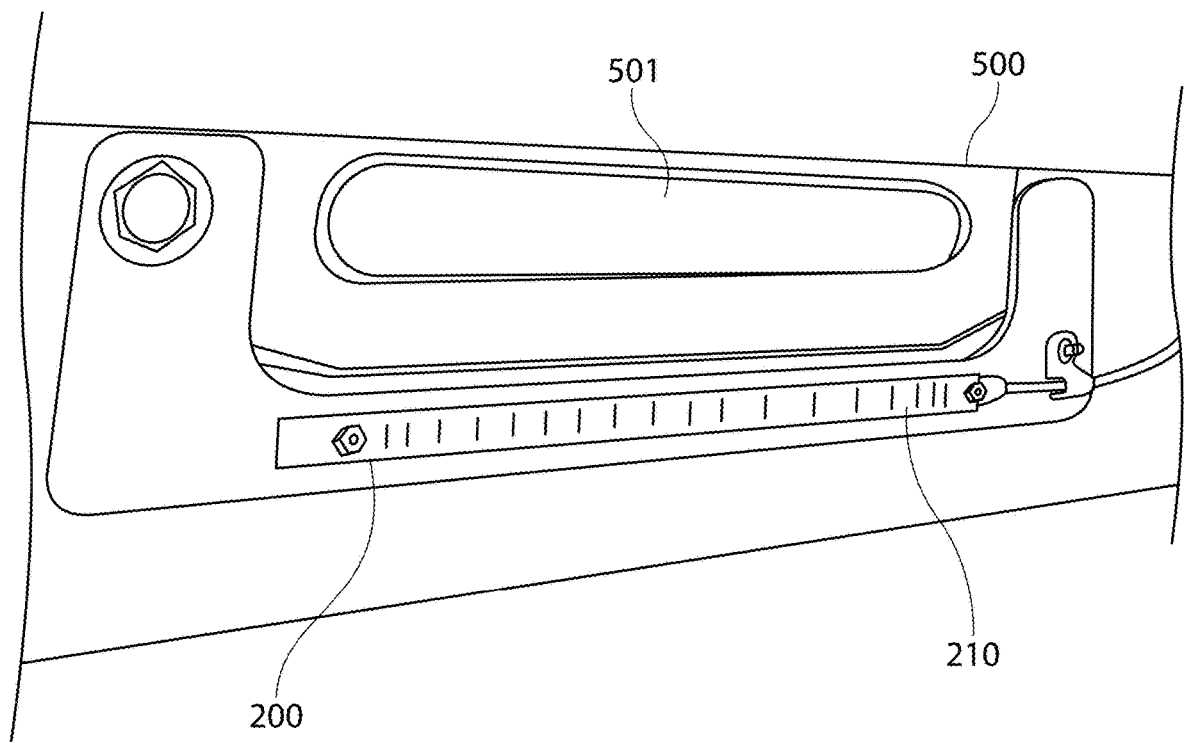
FIG. 5b illustrates a winch drum light assembly in a second configuration relative to a vehicle front member in accordance with an exemplary embodiment of the present invention.
Figure 5C:
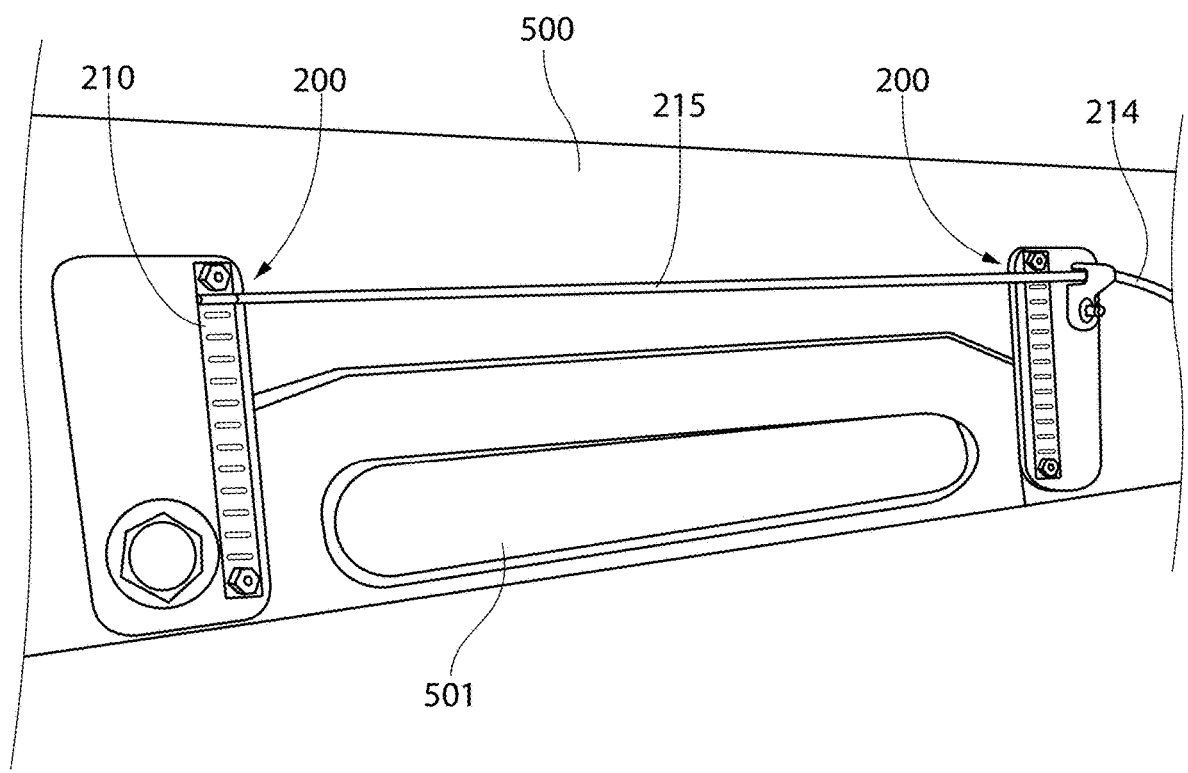
FIG. 5c illustrates a winch drum light assembly in a third configuration relative to a vehicle front member in accordance with an exemplary embodiment of the present invention.
Figure 5D:
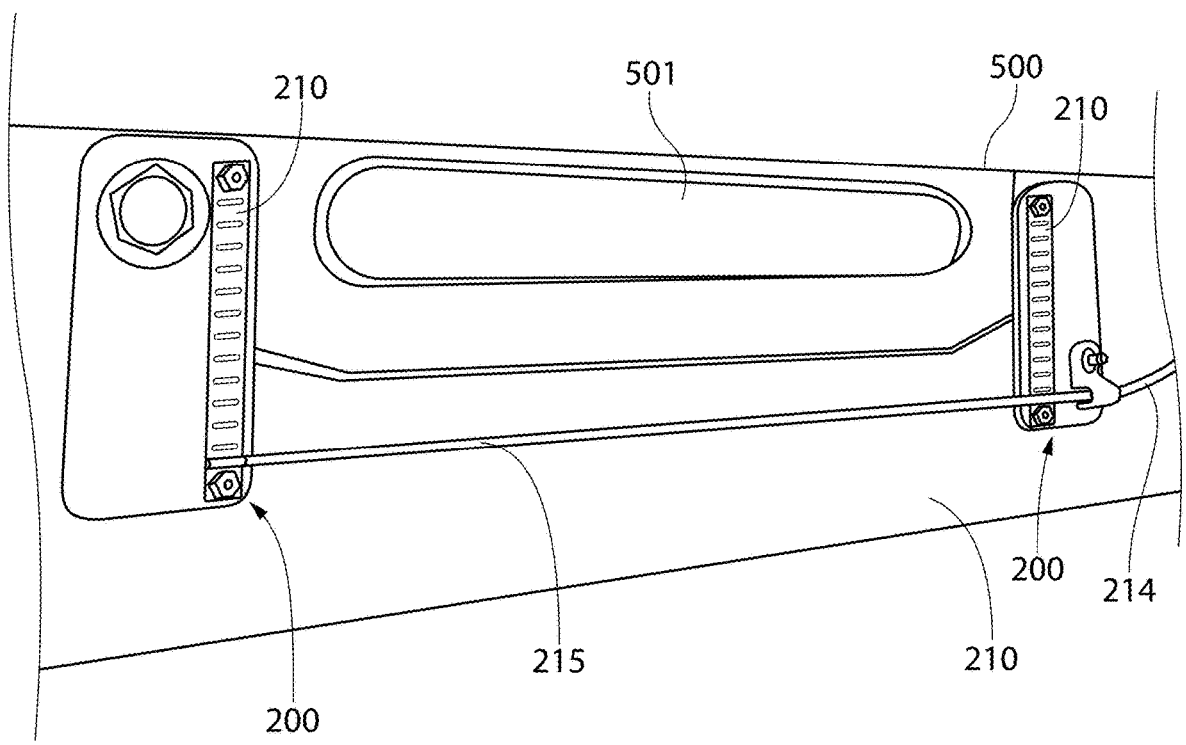
FIG. 5d illustrates a winch drum light assembly in a fourth configuration relative to a vehicle front member in accordance with an exemplary embodiment of the present invention.

FIG. 5a illustrates a winch drum light assembly in a first configuration relative to a vehicle front member in accordance with an exemplary embodiment of the present invention. FIG. 5b illustrates a winch drum light assembly in a second configuration relative to a vehicle front member in accordance with an exemplary embodiment of the present invention. FIG. 5c illustrates a winch drum light assembly in a third configuration relative to a vehicle front member in accordance with an exemplary embodiment of the present invention. FIG. 5d illustrates a winch drum light assembly in a fourth configuration relative to a vehicle front member in accordance with an exemplary embodiment of the present invention.

In FIG. 5a, bracket 200 is installed on the rear surface of vehicle front member 500. In one example, bracket 200 is installed on the back side of the fairlead opening. Front member 500 may be, for example, a vehicle's front bumper. In the view shown in FIG. 5a, the winch has been removed, and the view that is shown is from where the winch normally resides looking forward toward front member 500. Bracket 200 in FIG. 5a has been positioned so that light member 210 is above opening 501 in front member 500.

In FIG. 5b, bracket 200 is also installed on the rear surface of vehicle front member 500. FIG. 5b differs from FIG. 5a in that in FIG. 5b bracket 200 is oriented so that light member 210 is below opening 501.

FIGS. 5a and 5b also illustrates that light member 210 may be positioned above or below attachment locations 206.

In FIG. 5a and FIG. 5b, light from light member 210 illuminates the winch cable from a side of the drum. While light member 210 is shown being substantially parallel with the rear surface of front member 500, light member 210 may also be angled upward or downward to improve lighting of the winch cable as it wraps around the winch drum.

FIGS. 5c and 5d illustrate that instead of a single light member as shown in FIG. 5a and FIG. 5b, multiple light members 210 may be used (with or without a supporting member situated therebetween). The light members receive current from wire 214. Wire 215 transmits current between light members 210.

Figure 6:
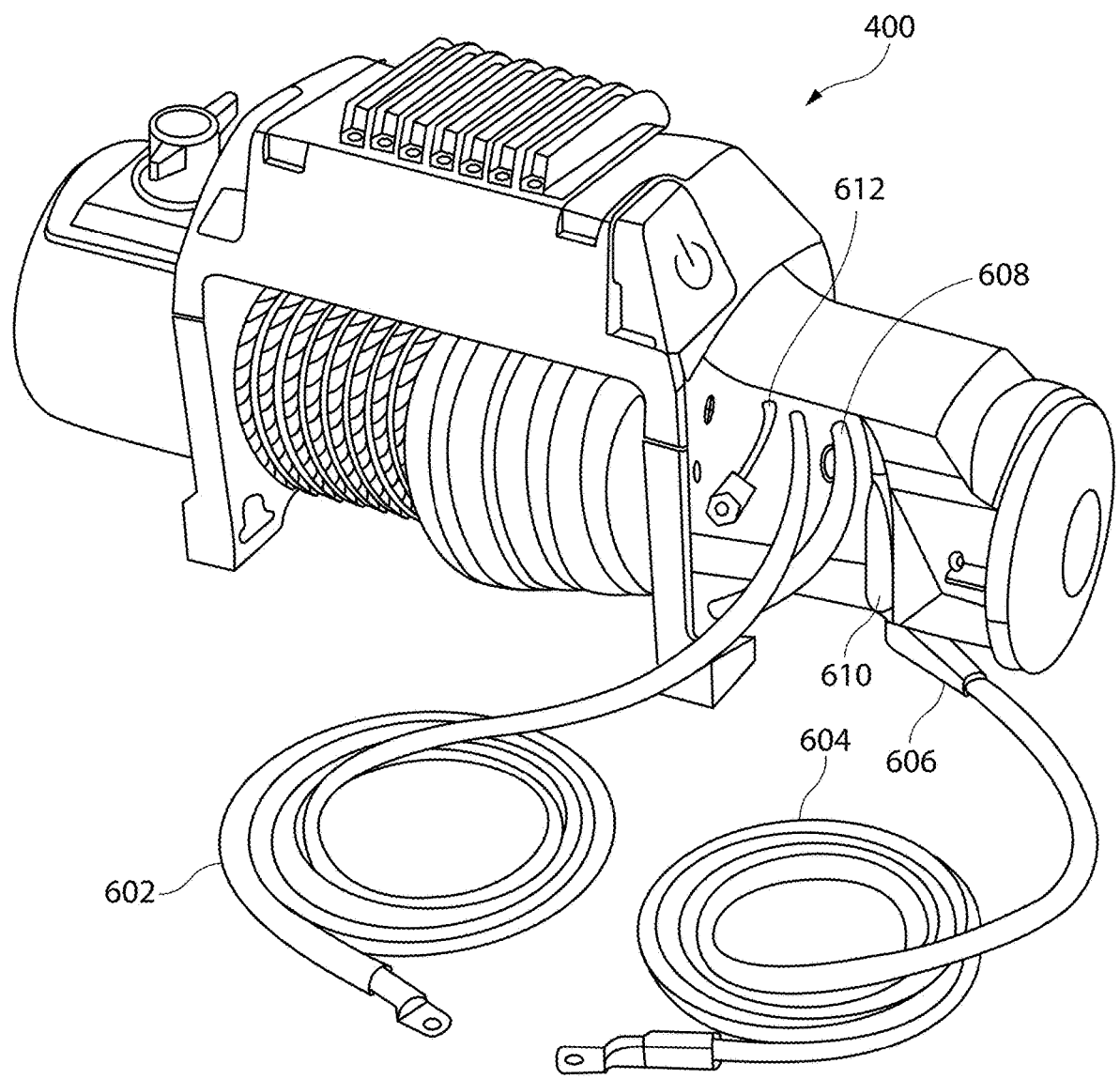
FIG. 6 is a perspective drawing of a winch with power cables and internal cables shown.

FIG. 6 is a perspective view of a winch in which various cables that are useful for winch operation are illustrated and identified. Positive cable 602 and negative cable 604 are desirably attached to a power source (such as a vehicle's battery) in order to power winch 400. Solenoid ground wire 606, motor stator cable 608, motor rotator cable 610 and motor stator cable 612 are shown.

Power Module 220 placed between light member 210 and the winch motor hookup wires can be used to power light member 210. Power module 220 receives power and ground directly from a vehicle's battery (although power can be received from another source, as explained below). Module 220 automatically turns light member 210 "ON" by a trigger wire that is attached to the "A" terminal (Motor Rotator Cable 610) on the winch. The "A" terminal only sees 12 volts when the winch motor is electrically activated and turning. Module 220 can be programmed to keep light member 210 illuminated after winch 400 has been stopped and then time out unless one of the trigger wires receives 12 v before the pre-programmed timing out period. Therefore, module 220 would reset the "clock" each time the trigger wire sees 12 volts (or motion is detected by some other means including mechanical, optical, and/or electrical detection). Alternatively, energizing of light member 210 can stop responsive to an event, or after a time period following an event. Such events can include detecting mechanically the absence of motion of the winch cable/drum, detecting optically the absence of motion of the winch cable/drum, detecting electrically (via absence of specific electrical signal, absence of capacitive change, etc.) or by other means. As another alternative, light member 210 can be turned off responsive to detection of motion of the vehicle to which bracket 200 is attached. Such motion detection can be via a motion detector (within power module 220) for example, or detection of motion of smartphone in the possession of a vehicle occupant. In that case, a smartphone can communicate with module 220 (for example via USB, wi-fi, cellular, Bluetooth, etc.) and signal power module 220 when the smartphone is in motion within a vehicle (e.g. the smartphone indicates it is in a vehicle moving faster than a threshold speed such as 10 MPH).

Figure 7A:
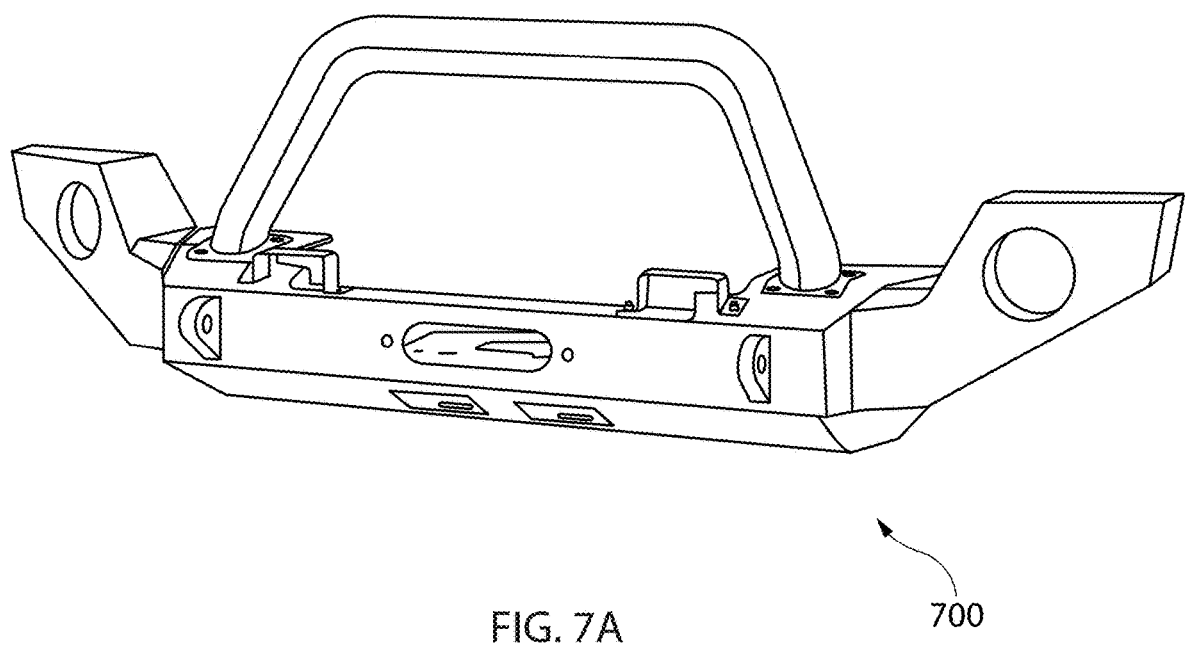
FIG. 7A is a perspective drawing of the front of a front bumper as an example of a front member.
Figure 7B:
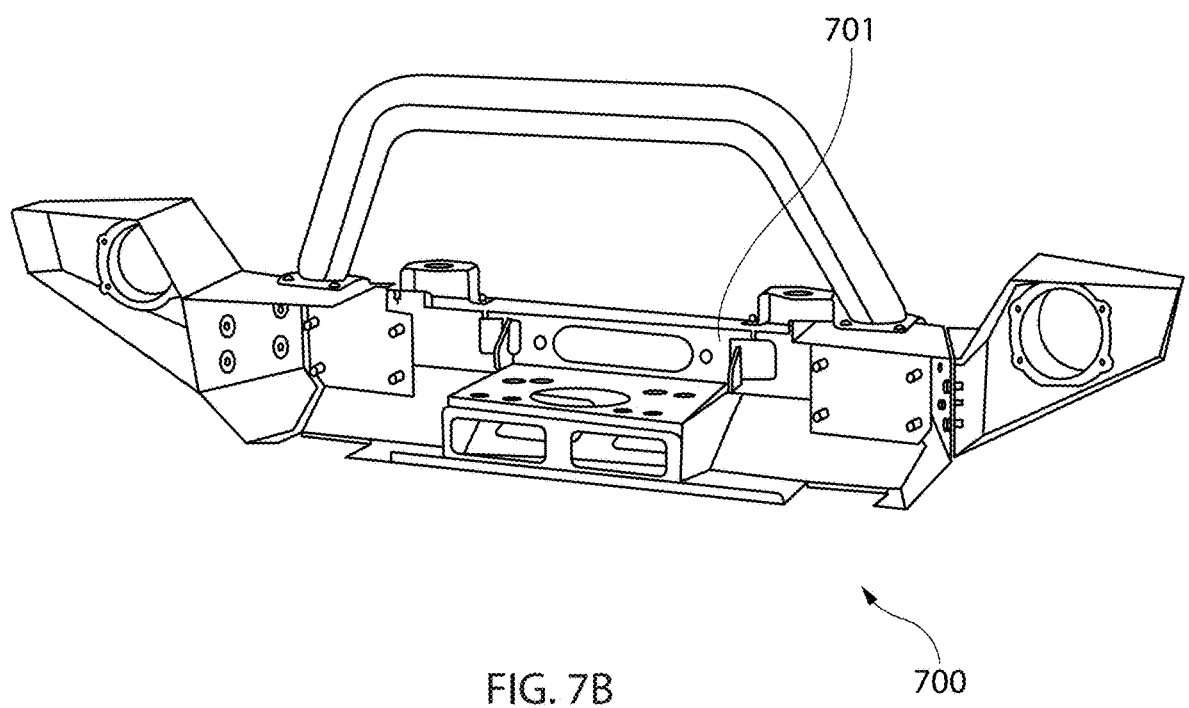
FIG. 7B is a perspective drawing of the rear of a front bumper as an example of a front member.

FIGS. 7A and 7B are respective front and rear views of an exemplary vehicle front bumper 700, which is a front member situated at (or near) the front of a vehicle. Bumper 700 is shown as including a slot (e.g. fairlead slot) through which the winch cable extends and retracts. An external fairlead may be added to bumper 700 at the slot, or a fairlead may be built into bumper 700. Bracket 200 may be attached to rear surface 701 of bumper 700.

Figure 8:
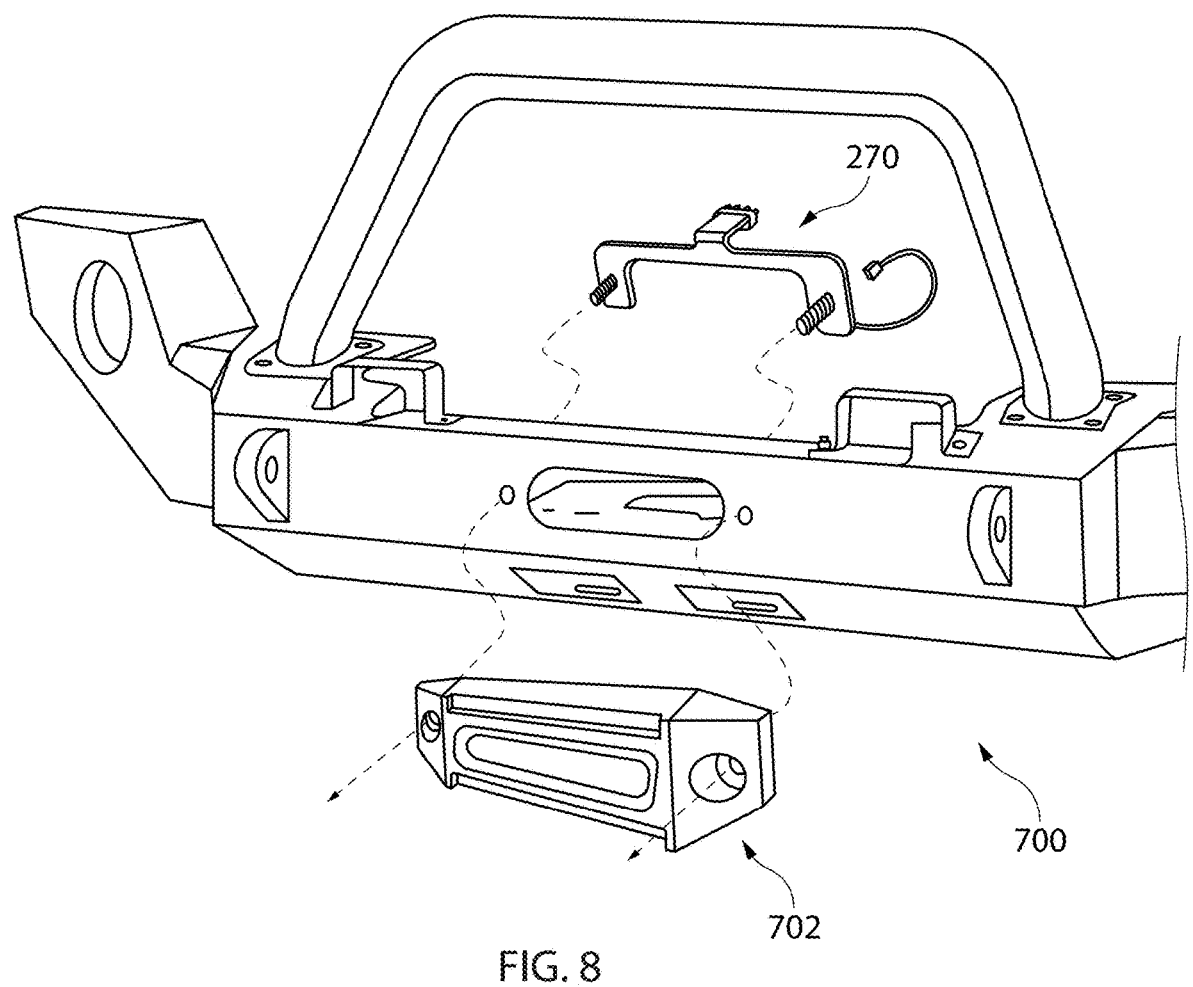
FIG. 8 is a perspective drawing of the front of a front bumper in accordance with an exemplary embodiment of the present invention.

FIG. 8 is a perspective drawing of an exemplary front bumper 700, which is a front member, and which is used in combination with a further exemplary light fixture 270, although light fixture 210 may also be used. FIG. 8 illustrates that light fixture 270 is attached to rear surface 701 of bumper 700. Fairlead 702 is also attached to bumper 700. Light fixture 270 (or light fixture 210) may be attached to rear surface 701 (shown in FIG. 7B).

Figure 9A:
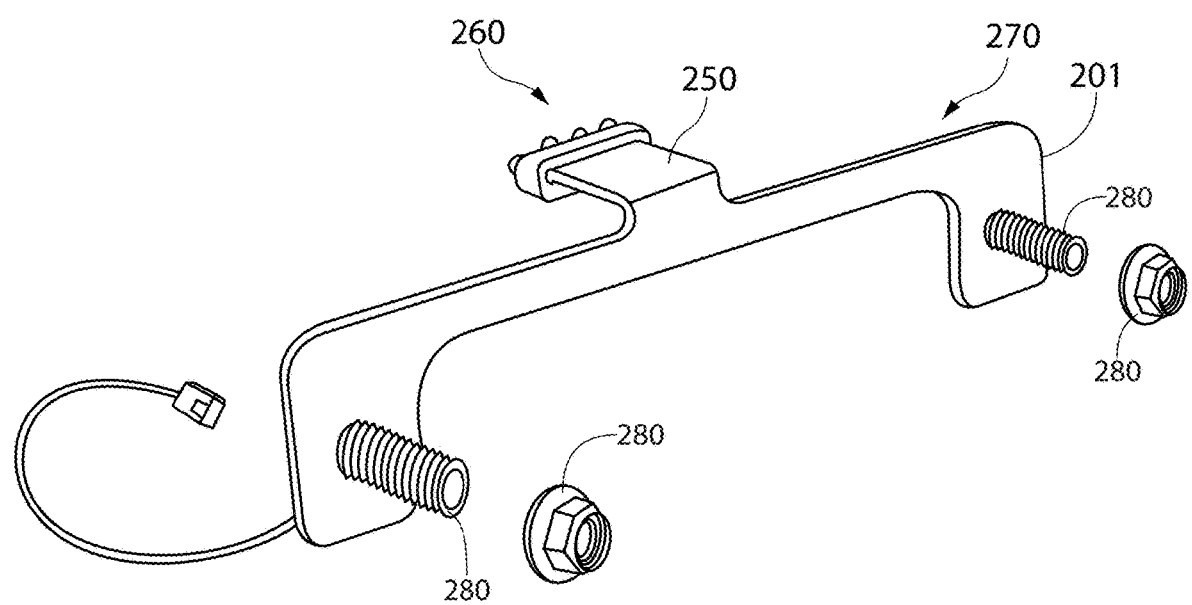
FIG. 9a is a perspective drawing that illustrates one side of an exemplary embodiment of the present invention.
Figure 9B:
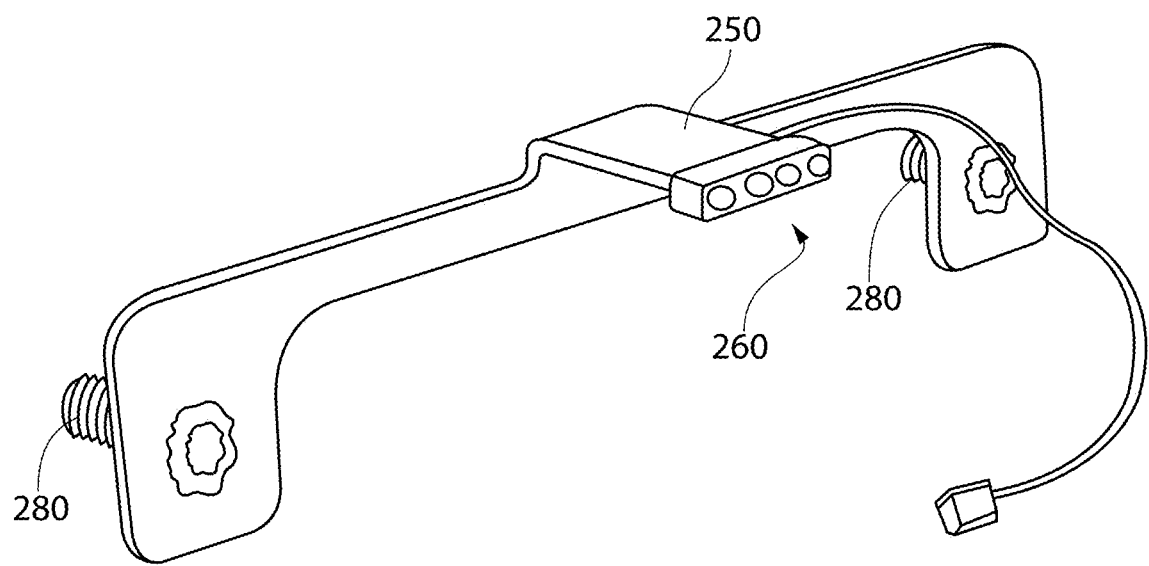
FIG. 9b is a perspective drawing that illustrates another side of an exemplary embodiment of the present invention.

FIG. 9A and FIG. 9B are perspective drawings of exemplary light fixture 270. Light fixture 270 differs from light fixture 210 in that light fixture 270 includes extender 250 that extends the source of light away from bracket 201. Extender 250 is optional and allows light to be directed onto the winch cable at closer proximity than other embodiments. Light assembly 260 is also included. Light assembly 260 may be individual LEDs, or a light strip such as light member 210, although other types of light packaging are contemplated. Light fixture 270 (as well as light fixture 210, and other exemplary embodiments) may include welded studs for mounting to bumper 700 (or any other front member) or through holes for bolts. The welded studs or bolts may have a dual purpose in that they may also be used to secure the fairlead to the front of bumper 700. Nuts may be used to secure the fairlead to the welded studs or bolts extending from/through light fixture 210/270 and bumper (or front member) 700.

Power module 220 has been described as energizing light member 210 or preventing light member 210 from being energized. Alternatively, power module 220 may transition between two or more levels of energizing light member 210, wherein one level is less than the other level.

A remote controller has been described, but other forms of control may be included, including remote wired control or control via a cellular, Wi-Fi or Bluetooth device such as a smartphone.

The above description has included the exemplary feature of powering the lighting source (such as light member 210) from the vehicle battery. It is understood, however, that the lighting source may be powered from another source of power. For example, a separate battery may be included with one or more exemplary embodiments of the present invention in order to power the lighting source. The battery may be disposable, rechargeable, solar powered, etc. In a further embodiment, a switch (e.g. rocker switch) is included in one or more locations (on bracket 200, on power module 220, and/or in another location) to turn on the lighting source. The lighting source can be turned off with the switch, the lighting source can be turned off after a predetermined time delay, the lighting source can be turned off responsive to other detection (i.e. the types of detection described above including mechanical, optical, electrical, etc.), and/or the lighting source can be turned off by another means.

The above description has included the step of stopping the delivery of power to the light member. As an alternative, delivery of power to the light member can be reduced without being stopped.

While various exemplary embodiments have been described, it is understood that embodiments may be combined. Also, aspects of one embodiment may be combined with aspects of another embodiment.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

EXEMPLARY PARTS LIST

200 Bracket
201 Bracket
202 Cross Member
204 Tab
206 Attachment Location
208 Attachment Member
210 Light Member
212 Screws
214 Wire
216 Power Connection
218 Wire Assembly
219 Connector
220 Power Module
221 Receiver
222 Wire Assembly
224 Wire Assembly
226 Trigger Wire
230 Wire
232 Fuse Holder
234 Power Wire
236 Ground Wire
240 Remote Controller
250 Extender
260 Light Assembly
302 Harness
304 Harness
310 Connector
312 Connector
314 Connector
316 Connector
318 Y-Cable Assembly
320 Y-Cable Assembly
400 Winch
402 Outlet
500 Front Member
501 Opening
602 Positive Cable
604 Negative Cable
606 Solenoid Ground Wire
608 Motor Stator Cable
610 Motor Rotator Cable
612 Motor Stator Cable
700 Bumper
701 Attachment surface
702 Fairlead

The invention claimed is:

1. A winch drum light assembly comprising:
   a bracket having at least one attachment location adapted for attaching the bracket to a front member of a vehicle, the front member of the vehicle located at a front of said vehicle opposite to a rear of said vehicle; and
   a light member attached to the bracket, the light member including a power connection adapted for connecting the vehicle's power to the light member, the light member spaced apart from a winch, the winch having a drum, the light member adapted for generating light and directing said light towards at least a portion of a winch cable that is wrapped around the drum.

2. A winch drum light assembly according to claim 1, wherein said light member is situated above or below the at least one attachment location.

3. A winch drum light assembly according to claim 1, wherein the power connection is a plug-type connector.

4. A winch drum light assembly according to claim 1, wherein the at least one attachment location is where the bracket defines at least one opening that receive screw/bolt-like member for attaching the bracket to the vehicle or to the vehicle component.

5. A winch drum light assembly according to claim 1, further comprising a power module coupled to the light member for delivering power to the light member for a predetermined time period, and then reducing or stopping said delivering power.

6. A winch drum light assembly according to claim 5, wherein said power module delivers said power responsive to detecting electrical fluctuation and reduces/stops delivery of said power based on a timer.

7. A winch drum light assembly according to claim 5, wherein said power module delivers said power responsive to detecting winch motion.

8. A winch drum light assembly according to claim 5, wherein said power module includes a receiver for receiving a signal to energize said light member via remote control.

9. A winch drum light assembly according to claim 1, further comprising a connector for receiving said power in parallel with power being provided with other lighting included in said vehicle.

10. A winch drum light assembly according to claim 1, wherein the power connection includes a plug-like member, wherein the winch drum light assembly includes a winch, and wherein the winch includes a receptacle for receiving the plug-like member to provide the vehicle's power to the light member.

11. A winch drum light assembly according to claim 1, wherein the light member shines light onto a spool of said winch.

12. A winch drum light assembly according to claim 1, wherein the light member receives the vehicle's power to energize the light member responsive to an electrical connection associated with a winch transitioning in current when the winch's motor transitions from stationary to rotating.

13. A winch drum light assembly according to claim 1, wherein the winch drum light assembly is attached to a rear of the vehicle's front bumper assembly, wherein the front bumper assembly has a fairlead opening.

14. A winch drum light assembly according to claim 1, wherein the front member is a front bumper.

15. A lighting system for a winch, comprising,
a lighting bracket adapted for mounting on a front member of a vehicle between a winch fair lead and a winch, the front member of the vehicle located at a front of said vehicle opposite to a rear of said vehicle;
a light source attached to the lighting bracket and facing the winch, wherein the light source is spaced away from said winch, the winch having a drum, the light member adapted for generating light and directing said light towards at least a portion of a winch cable that is wrapped around the drum; and
power cables for transmitting power to the light source to energize the light source.

16. A lighting system according to claim 15, wherein light is shined on the winch when the light source is energized.

17. A lighting system according to claim 15, wherein the lighting system includes a timer for energizing the light source and then reducing/stopping energizing of the light source after a time period has elapsed.

18. A lighting system according to claim 15, wherein the front member is a front bumper.

19. A method of illuminating a winch, said method comprising the steps of:
providing a bracket adapted for installation to a front member of a vehicle, the front member of the vehicle located at a front of said vehicle opposite to a rear of said vehicle, said bracket including a light source adapted for illuminating a winch separate from said bracket and mounted to said vehicle, the winch having a drum, the light source adapted for generating light when the light source is energized; and
providing a power connection connected to said light source, said power connection adapted for receiving power from said vehicle for energizing said light source to generate light and direct said light towards at least a portion of a winch cable that is wrapped around the drum.

20. A method of illuminating a winch according to claim 19, wherein the front member is a front bumper.

* * * * *